United States Patent
Liu

(10) Patent No.: US 6,958,565 B1
(45) Date of Patent: Oct. 25, 2005

(54) PASSIVE WIRELESS PIEZOELECTRIC SMART TIRE SENSOR WITH REDUCED SIZE

(75) Inventor: James Z. Liu, Rockford, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/818,403

(22) Filed: Apr. 5, 2004

(51) Int. Cl.[7] ................. H01L 41/08; H01L 41/04
(52) U.S. Cl. ........................................ 310/313 R
(58) Field of Search ........... 310/313 R, 313 A–313 B, 310/322; 73/703, 702, 24.06; H01L 41/08, H01L 41/04

(56) References Cited

U.S. PATENT DOCUMENTS

| | | | | |
|---|---|---|---|---|
| 5,155,708 A | | 10/1992 | Bedi et al. ................. 367/152 |
| 5,675,314 A | * | 10/1997 | Chaklader ................. 73/146.5 |
| 5,821,425 A | * | 10/1998 | Mariani et al. ............ 73/703 |
| 6,055,855 A | | 5/2000 | Straub ........................ 73/146.8 |
| 6,144,288 A | * | 11/2000 | Jahn et al. ................ 340/10.33 |
| 6,293,136 B1 | * | 9/2001 | Kim ........................ 310/313 D |
| 6,314,791 B1 | | 11/2001 | Rapp et al. ................ 73/24.06 |
| 6,568,271 B2 | | 5/2003 | Shah et al. ................. 73/599 |
| 6,640,613 B2 | | 11/2003 | Rapp et al. ................ 73/24.01 |
| 2002/0113521 A1 | | 8/2002 | Rapp et al. ............. 310/313 R |
| 2003/0076743 A1 | | 4/2003 | Thompson et al. ......... 367/140 |
| 2003/0196477 A1 | | 10/2003 | Auner et al. ............... 73/24.06 |

OTHER PUBLICATIONS

Johannes Niess, et al., "A miniaturized thermal desorption unit for chemical sensing below odor threshold", Sensor and Acuators, B 95 (2003), pp. 1-5.

John R. Vig, "Dual-mode Oscillators for Clocks and Sensors", 1999 IEEE Ultrasonics Symposium, pp. 859-868.

James Z. Liu, "Construction Optimization for Acoustic Wave Chemical Sensor Selectivity", (all pages), Sensor Expo Detroit, Sep. 2000.

* cited by examiner

*Primary Examiner*—Tom Dougherty
*Assistant Examiner*—Karen Beth Addison
(74) *Attorney, Agent, or Firm*—Kris T. Fredrick; Kermit D. Lopez; Luis M. Ortiz

(57) ABSTRACT

A surface wave device can be configured to include an interdigital transducer and an acoustic coating formed upon a piezoelectric substrate, wherein the interdigital transducer is selected to introduce negligible electrical coupling to surface waves thereof. Additionally, an antenna can be integrated with the surface wave device, wherein the antenna receives one or mores signals, which excite the acoustic wave device to produce multiple modes frequency outputs in which temperature and pressure effect changes are separated from one another for analysis thereof.

20 Claims, 4 Drawing Sheets

PASSIVE WIRELESS PIEZOELECTRIC SMART TIRE SENSOR WITH REDUCED SIZE

TECHNICAL FIELD

Embodiments are generally related to sensing devices and techniques. Embodiments are also related to interdigital surface wave sensor devices, such as, for example, surface acoustic wave (SAW) and bulk acoustic wave (BAW) devices and sensors. Embodiments also relate to tire pressure and temperature sensors utilized for monitoring vehicle tires.

BACKGROUND OF THE INVENTION

Acoustic wave sensors are utilized in a number of sensing applications, such as, for example, temperature, pressure and/or gas sensing devices and systems. Examples of surface wave sensors include devices such as acoustic wave sensors, which can be utilized to detect the presence of substances, such as chemicals. An acoustic wave (e.g., SAW/BAW) device acting as a sensor can provide a highly sensitive detection mechanism due to the high sensitivity to surface loading and the low noise, which results from their intrinsic high Q factor.

Surface acoustic wave devices are typically fabricated using photolithographic techniques with comb-like interdigital transducers placed on a piezoelectric material. Surface acoustic wave devices may have either a delay line or a resonator configuration. The selectivity of a surface acoustic wave chemical/biological sensor is generally determined by a selective coating placed on the piezoelectric material. The absorption and/or adsorption of the species to be measured into the selective coating can cause mass loading, elastic, and/or viscoelastic effects on the SAW/BAW device. The change of the acoustic property due to the absorption and/or adsorption of the species can be interpreted as a delay time shift for the delay line surface acoustic wave device or a frequency shift for the resonator (BAW/SAW) acoustic wave device.

Acoustic wave sensing devices often rely on the use of quartz crystal resonator components, such as the type adapted for use with electronic oscillators. In a typical gas-sensing application, the absorption of gas molecules in a selective thin film coating (i.e., applied to one surface of the crystal) can increase the mass of the crystal, while lowering the crystal's resonant frequency. The frequency of a thickness shear mode (TSM) crystal unit, for example, such as an AT-cut unit, is inversely proportional to the thickness of the crystal plate. For example, a typical 5-MHz 3rd overtone plate is on the order of 1 million atomic layers thick. The absorption of analyte is equivalent to the mass of one atomic layer of quartz, which changes the frequency by approximately 1 ppm.

The thickness-shear-mode resonators are therefore widely referred to as a quartz crystal microbalance. Calculations have determined that the sensitivity of a fundamental mode is approximately 9 times more sensitive than that of a 3rd overtone. A 5 MHz AT-cut TSM crystal blank, for example, is approximately 0.33 mm thick (fundamental). The thickness of the electrodes can be, for example, in a range of approximately 0.2–0.5 $\mu$m. The change in frequency due to the coating is typically: $\Delta F = -2.3 \times 10^6 \, F^2 \, (\Delta M/A)$, where the value $\Delta F$ represents the change in frequency due to the coating (Hz), F represents the frequency of the quartz plate (Hz), $\Delta M$ represents the mass of deposited coating (g), and the value A represents the area coated (cm$^2$).

Selective adsorbent thin film coated acoustic sensors such as, for example quartz crystal resonators, surface acoustic wave and quartz crystal microbalance devices are attractive to chemical/biological detection applications because of their high sensitivity, selectivity and ruggedness. The detection mechanism implemented depends on changes in the physicochemical and electrical properties of the coated piezoelectric crystal when exposed to gas. Measurement results are usually obtained as the output frequency of a loop oscillator circuit, which utilizes a coated crystal as the feedback element.

\When the sensor is exposed to analytes, the thin film adsorbs the analytes, and a corresponding frequency shift is measured as a result of any physicochemical and electrical changes. Factors that contribute to the coating properties include coating density, coating modulus, substrate wetting, coating morphology, electrical conductivity, capacitance and permittivity. Coating materials selection, coating structures and coating techniques affect the sensors' responses.

Conventional techniques for thin film deposition vary extensively, depending on the properties of the coating materials and substrate. Examples of such techniques include CVD, PVD, and sol-gel for most of the inorganic and composite materials. For polymeric materials, self-assembly dipping methods, casting, spray coating, and/or spin coating from a solution of the polymer in a volatile solvent are often preferred. Configurations based on these conventional techniques generally determine the properties of an acoustic wave sensor. Coating methods are also important for a sensor's repeatability. Because of their relatively short lifetimes, such sensors are replaced more often than those based on metal oxide. When sensors are replaced, they lose their memory of previously learned odors. In other words, the response curves of such devices vary, and the replacement sensors must then be retrained and/or recalibrated.

For practical reasons, zeolites are widely utilized as the physisorption coating materials. Zeolites are crystalline alumino-silicates of alkali or alkaline earth elements (e.g., Li, Na, K, Mg, Ca, Ba) with frameworks based on extensive 3-dimentional networks of $AlO_4$ and $SO_4$ tetrahedra. These tetrahedra are assembled into secondary polyhedral building blocks such as cubes, octahedral and hexagonal prisms. The final zeolite structure consists of assemblages of the secondary blocks into a regular, 3-dimentional crystalline framework. Each aluminum atom has a (−1) charge and this gives rise to an anionic charge in the network.

Cations are necessary to balance the charge and occupy non-framework positions. Typically the framework is composed of a regular structure of interconnected cages and/or channels. These systems of essentially "empty" cages and/or channels provide the high storage capacities necessary for good adsorbents. Zeolite adsorbents are characterized by their uniform intra-crystalline aperture sizes. The uniformly sized apertures enable molecular discrimination on the basis of size (e.g., steric separation). Molecules larger than the maximum size that can diffuse into the crystal are excluded. The adsorption capacity and selectivity can be significantly affected by the type of cation used and the extent of ion exchange. This type of modification is important in optimizing zeolites for gas separation.

The uniform pore structure, ease of aperture size modification, excellent thermal and hydrothermal stability, high sorption capacity at low partial pressures, and modest cost have made zeolites widely used in many separation application. For example, a selective adsorbent thin film coated quartz crystal microbalance chemical sensor can be utilized for the selective detection of CO. The thin coating comprises a solid non-porous inorganic matrix and porous zeolite crystals contained within the inorganic matrix, the pores of the zeolite crystals selectively adsorb chemical entities of a size less than a preselected magnitude.

The matrix can be selected from the group of sol-gel derived glasses, polymers and clay. The pores of the zeolite crystals are modified so as to be Lewis or Bronsted acidic or basic and capable of providing intrazeolite ligation by the presence of metal ions. The film is an alumina, boro-alumino-silicate, titania, hydrolyzed diethoxydiphenyl silane, or silane rubber matrix containing zeolite crystals. The thickness of the inorganic matrix is generally about 0.001–10 $\mu$m and the diameter of the pores of the zeolite crystals is approximately 0.25–1.2 nm. The coating is a single layer of zeolite crystals protruding from an amorphous $SiO_2$ matrix.

A polymer can be defined as a compound consisting of a large number of repeating units, called monomers. These monomers are joined together by covalent bonds to form a long chain. The degree of polymerization is defined as the number of repeating units in the chain. The properties of the polymer depend on the overall size of the polymer chain and on the inter- and intra-molecular forces that hold the polymer together. In general, the polymer properties of interest can be characterized as diffusion/permeation properties or as mechanical properties. The measurement of diffusion/permeation properties is straightforward when diffusion of a species into a polymer film produces a simple mass-loading effect. Polymers used as sensor coatings are butyl rubber, cellulose polymers, polysiloxanes, polyaniline and polyethylene, etc.

Polymers, specifically rubbery, amorphous polymers, have several inherent advantages as chemically sensitive sensor coatings. They can be deposited as thin, adherent, continuous films of fairly uniform thickness by solvent casting or spray coating. They are nonvolatile and of homogeneous composition, and their chemical and physical properties can be modified to some extent by judicious choice of monomers and synthetic procedures. The glass transition temperature Tg, is the temperature at which a polymer changes from glassy to rubbery. Above Tg, permeability is governed entirely by diffusion forces and adsorption proceeds rapidly and reversibly. One more advantage of rubbery, amorphous polymers is that their sorption isotherms are often linear over relatively large ranges in penetrant concentration.

In general, the coated adsorbent thin film must be uniform, adherent, thin, chemically and physically stable when in contact with its working medium. Uniformity in film thickness is not crucial, but can be important in some cases, i.e., when the rate of permeation is used to identify an analyte. The selectivity of the acoustic wave sensor is influenced by the structure of the coatings. The different film structures and thus different response properties can be achieved by varying the ratio of the materials forming the sensing film.

In order to construct a sensing film with desired response properties, the analyte molecules and sensing film materials can be mixed in a solution which in order to result in the most suitable formation because of affinity. The interaction force is selected by the affinity between the sensing film and analyte. This can easily result in a sensor with desired response properties. In the case of a gas sensor, in order to achieve the same result, one should fabricate the adsorbent thin film in a glove box filled with the sample gas. Other methods include molecular imprinting (i.e., forming specific sorption sites using molecularly imprinted polymers) and host-guest interaction (i.e., a result of structural interaction between a host molecule, such as cyclodextrin, and a guest molecule).

Acoustic wave sensors, such as those described above, can be utilized for a number of sensing operations, such as in monitoring vehicle tires. To date, most tire sensing systems incorporate sensor devices, such as SAW sensors, which typically incorporate 2–3 sensors on a single sensing chip. Such sensors are designed to sense pressure and temperature. It is believed, however, that such sensors can be improved if a design can be implemented in which only one sensor is located on a single chip, and which can sense a variety of activities such as both pressure and temperature.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved sensor devices and sensing techniques.

It is another aspect of the present invention to provide for an improved surface wave sensor device.

It is yet a further aspect of the present invention to provide an improved interdigital surface wave device, such as, for example, a multiple mode surface acoustic wave (SAW) or bulk acoustic wave (BAW) sensing devices.

It is also an aspect of the present invention to provide for a pressure and temperature sensor, which utilizes only one sensor on a sensing chip thereof, rather than a plurality of sensors on the chip.

The aforementioned aspects of the invention and other objectives and advantages can now be achieved as described herein. A sensor system and method are disclosed. A surface wave device can be configured to include an interdigital transducer and an acoustic coating formed upon a piezoelectric substrate, wherein the interdigital transducer is selected to introduce negligible electrical coupling to surface waves thereof. Additionally, an antenna can be integrated with the surface wave device, wherein the antenna receives one or mores signals, which excite the acoustic coating to produce multiple modes frequency outputs in which temperature and pressure effect changes are separated from one another for analysis thereof. A transmitter and receiver unit can also be provided for transmitting the signal to the antenna integrated with surface wave device for exciting the acoustic wave device to produce the multiple modes frequency outputs in which the temperature and pressure effect changes are separated from one another for analysis thereof.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
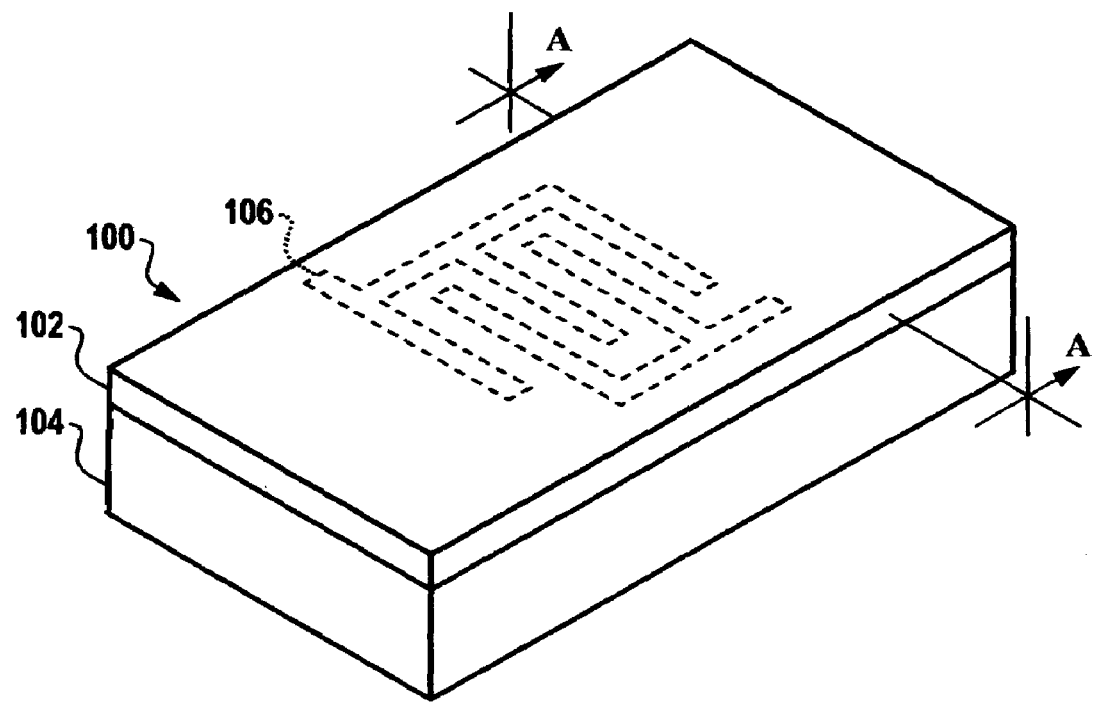
FIG. 1 illustrates a perspective view of an interdigital surface wave device, which can be implemented in accordance with one embodiment of the present invention.

FIG. 1 illustrates a perspective view of an interdigital surface wave device 100, which can be implemented in accordance with one embodiment of the present invention. Surface wave device 100 generally includes an interdigital transducer 106 formed on a piezoelectric substrate 104. The surface wave device 100 can be implemented in the context of a sensor chip. Interdigital transducer 106 can be configured in the form of an electrode. A coating 102 can be selected such that a particular species to be measured is absorbed by the coating 102, thereby altering the acoustic properties of the interdigital surface wave device 100. Various selective coatings can be utilized to implement coating 102. A change in acoustic properties can be detected and utilized to identify or detect the substance or species absorbed and/or adsorbed by the coating 102. Thus, coating 102 is generally excited to implement a surface acoustical model. Such an excitation, however, can produce a variety of other modes of interdigital surface wave device 100.

Many modes of vibrations can exist in interdigital surface wave device 100. such as, for example, surface acoustic wave (SAW) and bulk acoustic wave (BAW) modes. Unlike, interdigital surface wave device 100, most acoustic wave devices are designed such that only one mode of vibration is optimized, while other modes are suppressed. Such "undesired" mode(s), however, can be utilized for desorption in affinity/adsorption sensing. Such modes can include, for example, flexural plate mode (FPM), acoustic plate mode, shear-horizontal acoustic plate mode (SH-APM), amplitude plate mode (APM), thickness shear mode (TSM), surface acoustic wave (SAW) mode, bulk acoustic wave mode (BAW), Torsional mode, love wave, leaky surface acoustic wave mode (LSAW), pseudo surface acoustic wave mode (PSAW), transverse mode, surface-skimming mode, surface transverse mode, harmonic modes, and/or overtone modes. Thus, in accordance with embodiments disclosed herein, multiple vibration modes can be utilized to produce a multiple mode acoustic wave device, such as, interdigital surface wave device 100.

Figure 2:
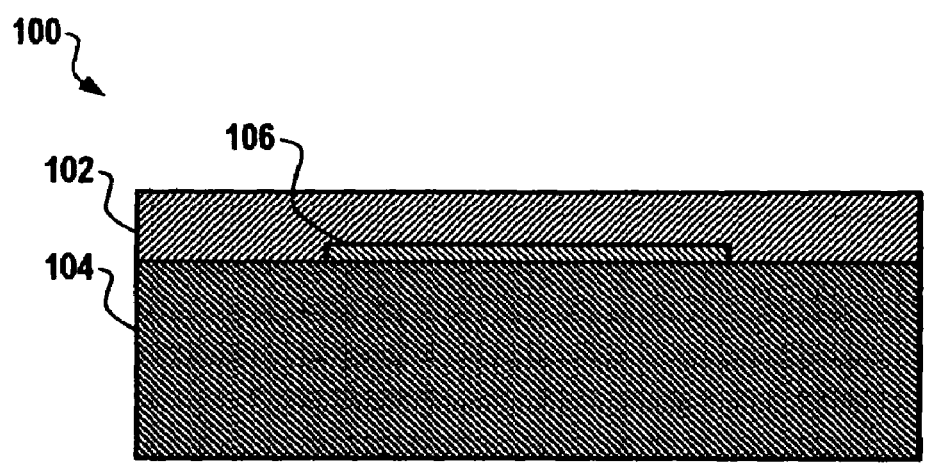
FIG. 2 illustrates a cross-sectional view along line A—A of the interdigital surface wave device depicted in FIG. 1, in accordance with one embodiment of the present invention.

FIG. 2 illustrates a cross-sectional view along line A—A of the interdigital surface wave device 100 depicted in FIG. 1, in accordance with one embodiment of the present invention. Piezoelectric substrate 104 can be formed from a variety of substrate materials, such as, for example, quartz, lithium niobate ($LiNbO_3$), lithium tantalite ($LiTaO_3$), $Li_2B_4O_7$, $GaPO_4$, langasite ($La_3Ga_5SiO_{14}$), ZnO, and/or epitaxially grown nitrides such as Al, Ga or Ln, to name a few. Interdigital transducer 106 can be formed from materials, which are generally divided into three groups. First, interdigital transducer 106 can be formed from a metal group material (e.g., Al, Pt, Au, Rh, Ir Cu, Ti, W, Cr, or Ni). Second, interdigital transducer 106 can be formed from alloys such as NiCr or CuAl. Third, interdigital transducer 106 can be formed from metal-nonmetal compounds (e.g., ceramic electrodes based on TiN, $CoSi_2$, or WC).

The coating 102 need not cover the entire planar surface of the piezoelectric substrate 104, but can cover only a portion thereof, depending upon design constraints. Selective coating 102 can cover interdigital transducer 106 and the entire planar surface of piezoelectric substrate 104. Because interdigital surface wave device 100 functions as a multiple mode sensing device, excited multiple modes thereof generally occupy the same volume of piezoelectric material. Multiple modes excitation allows separations of temperature change effects from pressure change effects. The multi-mode response can be represented by multiple mode equations, which can be solved to separate the response due to the temperature and pressure.

Figure 3:
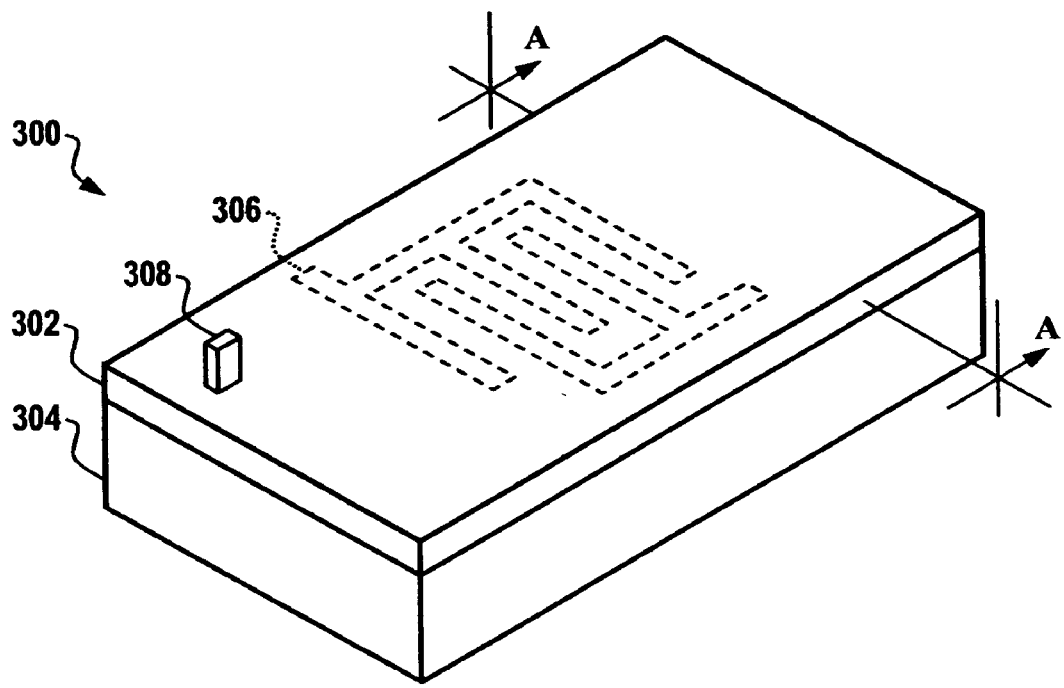
FIG. 3 illustrates a perspective view of an interdigital surface wave device, which can be implemented in accordance with an alternative embodiment of the present invention.
Figure 4:
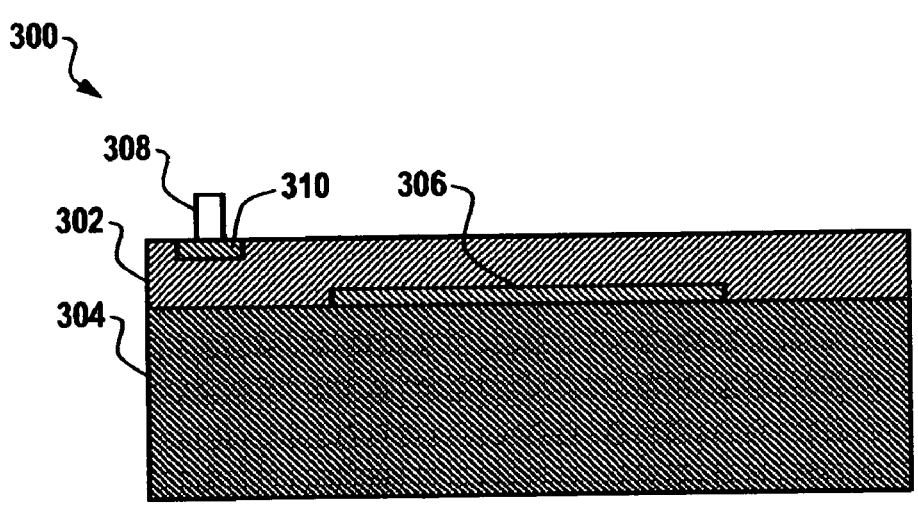
FIG. 4 illustrates a cross-sectional view along line A—A of the interdigital surface wave device depicted in FIG. 3, in accordance with one embodiment of the present invention.

FIG. 3 illustrates a perspective view of an interdigital surface wave device 300, which can be implemented in accordance with an alternative embodiment of the present invention. The configuration depicted in FIGS. 3–4 is similar to that illustrated in FIGS. 1–2, with the addition of an antenna 308, which is connected to and disposed above a wireless excitation component 310 (i.e., shown in FIG. 4). Surface wave device 300 generally includes an interdigital transducer 306 formed on a piezoelectric substrate 304. Surface wave device 300 can therefore function as an interdigital surface wave device, and one, in particular, which utilizing surface-skimming bulk wave techniques. Interdigital transducer 306 can be configured in the form of an electrode. A coating 302 can be selected such that a particular species to be measured is absorbed by the coating 302, thereby altering the acoustic properties of the interdigital surface wave device 300. Various selective coatings can be utilized to implement coating 302.

A change in acoustic properties can be detected and utilized to identify or detect the substance or species absorbed and/or adsorbed by the coating 302. Thus, coating 302 can be excited via wireless means to implement a surface acoustical model. Thus, antenna 308 and wireless excitation component 310 can be utilized to excite multiple modes, thereby allowing separation of temperature change effects from pressure change effects. Such an excitation can produce a variety of other modes of interdigital surface wave device 300.

FIG. 4 illustrates a cross-sectional view along line A—A of the interdigital surface wave device 300 depicted in FIG. 3, in accordance with one embodiment of the present invention. Thus, antenna 308 is shown in FIG. 4 disposed above coating 302 and connected to wireless excitation component 310, which can be formed within an area of coating 302. Similar to the configuration of FIG. 2, Piezoelectric substrate 304 can be formed from a variety of substrate materials, such as, for example, quartz, lithium niobate ($LiNbO_3$), lithium tantalite ($LiTaO_3$), $Li_2B_4O_7$, $GaPO_4$, langasite ($La_3Ga_5SiO_{14}$), ZnO, and/or epitaxially grown nitrides such as Al, Ga or Ln, to name a few. Interdigital transducer 306 can be formed from materials, which are generally divided into three groups. First, interdigital transducer 106 can be formed from a metal group material (e.g., Al, Pt, Au, Rh, Ir Cu, Ti, W, Cr, or Ni). Second, interdigital transducer 106 can be formed from alloys such as NiCr or CuAl. Third, interdigital transducer 306 can be formed from metal-nonmetal compounds (e.g., ceramic electrodes based on TiN, CoSi$_2$, or WC).

Figure 5:
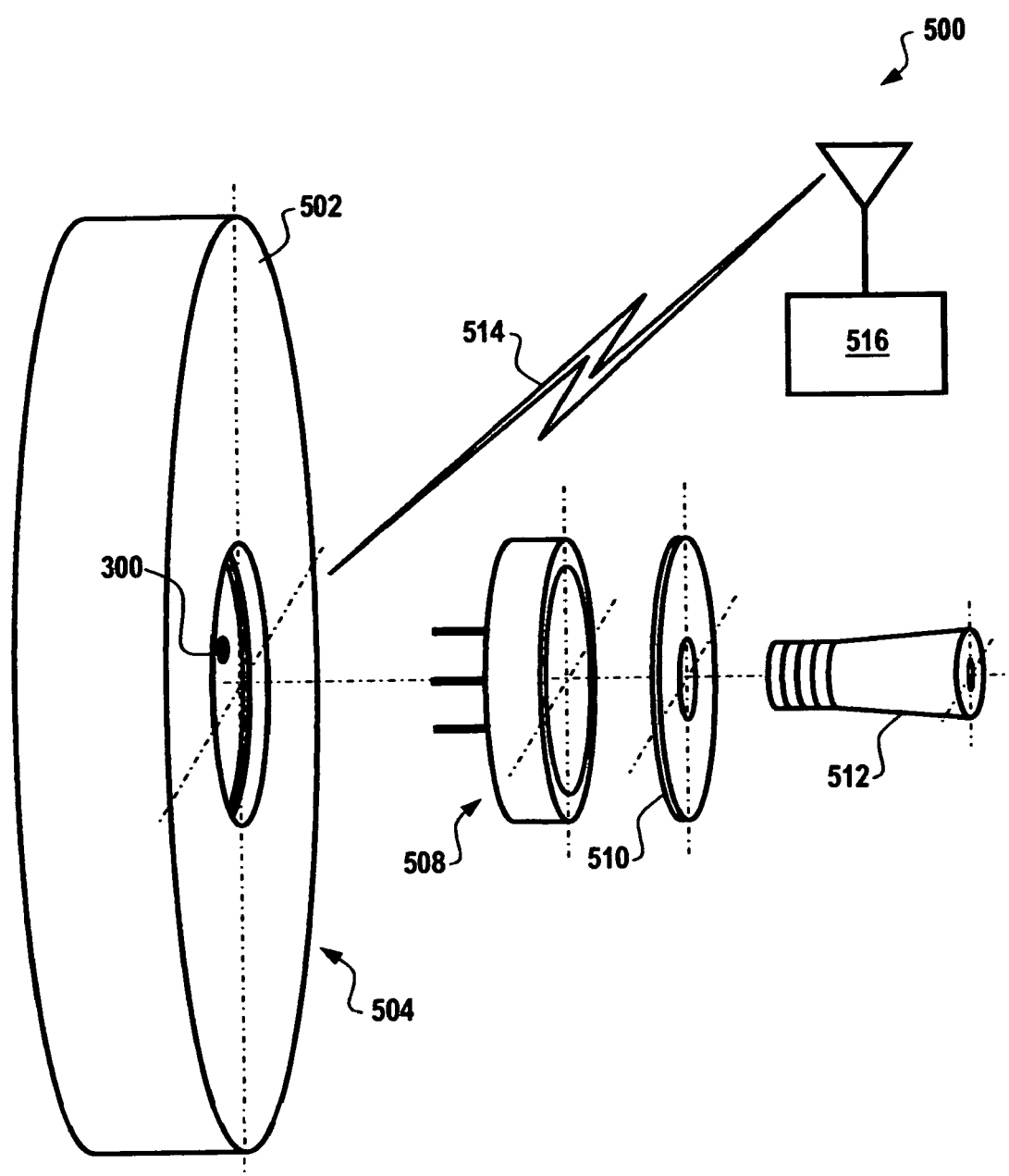
FIG. 5 illustrates an exploded view a tire sensor system, which can be implemented in accordance with an alternative embodiment of the present invention.

FIG. 5 illustrates an exploded view a tire sensor system 500, which can be implemented in accordance with an alternative embodiment of the present invention. System 500 can be implemented in the context of a tire 502 associated with a drum-type brake. It can be appreciated, however, that system 500 can be implemented in the context of other brake systems, such as disk brakes. Tire 502 includes a tire rim 504. System 500 includes a brake drum 506, which can interact with a backing plate 510, which in turn surrounds a vehicle axel 512.

System 500 also includes interdigital surface wave device 300, which is shown in greater detail in FIGS. 3–4. System 500 can be utilized to monitor the temperature and pressure of tire 502 by locating interdigital surface wave device 300 at a particular location on tire 502. A wireless signal (e.g., radio frequency, low frequency, etc.) can be transmitted to interdigital surface wave device 300 from a transmitter/receiver 516, which can be located within an automobile and/or elsewhere. The signal excites interdigital surface wave device 300, thereby providing multiple modes excitation, and allowing for the separation of temperature change effects from the pressure change effects. Multiple mode data can then be transmitted back to transmitter/receiver 516 for further collection and evaluation.

Figure 6:
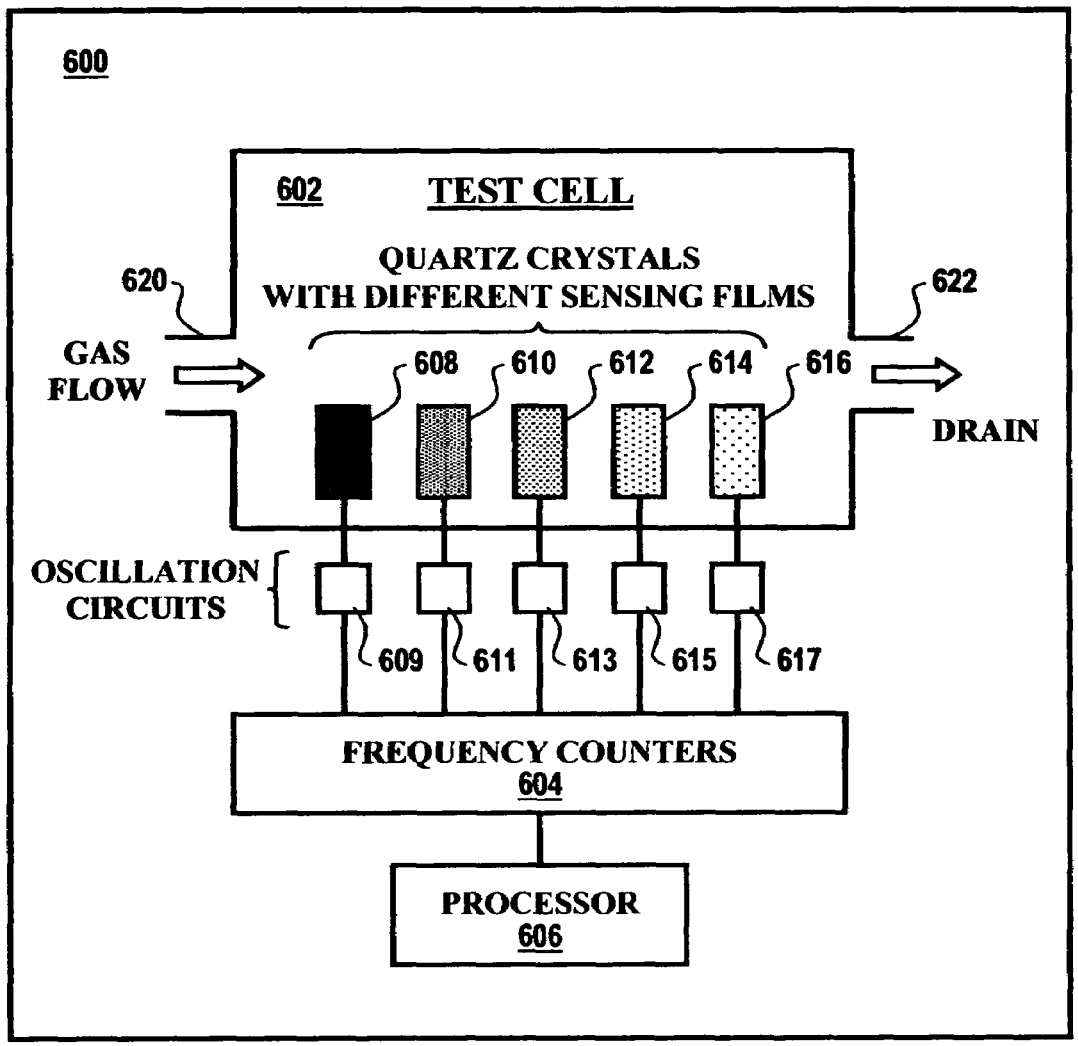
FIG. 6 illustrates a block diagram of an acoustic wave sensor system, which can be implemented in accordance with an alternative embodiment of the present invention.

FIG. 6 illustrates a block diagram of an acoustic wave sensor system 600, which can be implemented in accordance with an alternative embodiment of the present invention. System 600 comprises a wired design, rather than a wireless configuration such as that described above with respect to FIGS. 3–5. In such a system, multiple modes can be excited simultaneously by means of multiple oscillator circuits sharing a common piezoelectric device. System 600 can be utilized in place of interdigital surface wave device 300 depicted in FIG. 5. Of course, in such a configuration, the transmitter/receiver 516 would not be necessary.

System 600 therefore includes a plurality of quartz crystals 608, 610, 612, 614, and 616, which are located within a test cell 602. Each quartz crystal can be placed in a feedback path of an oscillator. For example, quartz crystal 608 can be placed in a feedback path of oscillator circuit 609, while quartz crystal 610 is generally placed in the feedback path of oscillator circuit 611. Similarly, quartz crystal 612 can be placed in the feedback path of oscillator circuit 613, while quartz crystal 613 is generally placed in the feedback path of oscillator circuit 615. Finally, quartz crystal 616 is generally placed in the feedback path of oscillator circuit 617. Oscillator circuits 609, 611, 613, 615 and 617 communicate with frequency counter 604, which in turn is under the command of a processor 606. In practice, gas flow or another chemical flow can enter test cell 602 through an entrance 620 and exist via a drain 622.

In terms of coating selection for an array of sensors, such as system 100 depicted in FIG. 1, a minimum number of sensor/coatings can be implemented, in order to adequately represent the data. Thus, coatings exhibiting similar or redundant response should be eliminated. A coating, when selected from a group of coatings, should be based on considerations such as sensitivity, stability or cost.

The selectivity of a chemical gas sensor can be improved by taking advantage of selective adsorbent materials. Some improvement can be achieved by utilizing selective permeable filters. Interferences, however, may not always be known before the use of sensor. In addition, applications that require simultaneous monitoring for multiple analytes require multiple sensors. In such cases, the use of arrays of sensors, each bearing a coating with a different degree of selectivity for the analytes of interest, can be utilized.

In terms of pattern-recognition analysis, a coating can be classified according to its response to a set of analytes. Each sensor in an array can be designed with a different coating, wherein each coating is selected to respond differently to the members of a set of analytes. The combination of responses should produce a unique fingerprint for each analyte. A number of methods have been developed for establishing correlations between the pattern of responses from an array of chemical sensors and identity of the corresponding analyte. The efficiency of the array depends on the uniqueness of the coating responses.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A sensor system, comprising:
   a surface wave device comprising an interdigital transducer and an acoustic coating formed upon a piezoelectric substrate, wherein said interdigital transducer is selected to introduce negligible electrical coupling to surface waves thereof; and
   an antenna integrated with said surface wave device, wherein said antenna receives at least one signal, which excites said acoustic coating to produce multiple modes frequency outputs in which temperature and pressure effect changes are separated from one another for analysis thereof.

2. The system of claim 1 further comprising a transmitter and receiver unit for transmitting said at least one signal to said antenna integrated with surface wave device for exciting said acoustic coating to produce said multiple modes frequency outputs in which said temperature and pressure effect changes are separated from one another for analysis thereof.

3. The system of claim 1 wherein said interdigital transducer comprises a quartz crystal.

4. The system of claim 1 wherein said multiple modes frequency outputs comprise at least one of the following types of data: flexural plate mode (FMP) data, acoustic plate mode data, and shear-horizontal acoustic plate mode (SH-APM) data.

5. The system of claim 4 wherein said multiple mode frequency outputs further comprises at least one of the following types of data: amplitude plate mode (APM) data, thickness shear mode (TSM) data, surface acoustic wave mode (SAW), and bulk acoustic wave mode (BAW) data.

6. The system of claim 5 wherein said multiple mode frequency outputs further comprises at least one of the following types of data: torsional mode data, love wave data, leaky surface acoustic wave mode (LSAW) data, and pseudo surface acoustic wave mode (PSAW) data.

7. The system of claim 6 wherein said multiple mode frequency outputs further comprises at least one of the following types of data: transverse mode data, surface-skimming mode data, surface transverse mode data, harmonic mode data, and overtone mode data.

8. The system of claim 1 wherein said interdigital transducer comprise electrode materials selected from among a group of materials comprising at least one of the following metals: Al, Pt, Au, Rh, Ir, Cu, Ti, W, Cr, or Ni.

9. The system of claim 1 wherein said interdigital transducer comprises electrode materials selected from among a group of materials comprising alloys.

10. The system of claim 1 wherein said interdigital transducer comprises electrode materials selected from among a group of materials comprising metal-nonmetal compounds.

11. A sensor system, comprising:
a surface wave device comprising an interdigital transducer and an acoustic coating formed upon a piezoelectric substrate, wherein said interdigital transducer is selected to introduce negligible electrical coupling to surface waves thereof;
an antenna integrated with said surface wave device, wherein said antenna receives at least one signal, which excites said acoustic coating to produce multiple modes frequency outputs in which temperature and pressure effect changes are separated from one another for analysis thereof; and
a transmitter and receiver unit for transmitting said at least one signal to said antenna integrated with surface wave device.

12. The system of claim 11 wherein said multiple modes frequency outputs comprise at least one of the following types of data:
flexural plate mode (FMP) data;
acoustic plate mode data;
shear-horizontal acoustic plate mode (SH-APM) data;
amplitude plate mode (APM) data;
thickness shear mode (TSM) data;
surface acoustic wave mode (SAW);
bulk acoustic wave mode (BAW) data;
torsional mode data, love wave data;
leaky surface acoustic wave mode (LSAW) data; or
pseudo surface acoustic wave mode (PSAW) data.

13. A sensor method, comprising:
configuring a surface wave device to comprise an interdigital transducer and an acoustic coating formed upon a piezoelectric substrate, wherein said interdigital transducer is selected to introduce negligible electrical coupling to surface waves thereof; and
integrating an antenna integrated said surface wave device, wherein said antenna receives at least one signal, which excites said acoustic coating to produce multiple modes frequency outputs in which temperature and pressure effect changes are separated from one another for analysis thereof.

14. The method of claim 13 further comprising the step of:
providing a transmitter and receiver unit for transmitting said at least one signal to said antenna integrated with surface wave device for exciting said acoustic coating to produce said multiple modes frequency outputs in which said temperature and pressure effect changes are separated from one another for analysis thereof.

15. The method of claim 13 wherein said interdigital transducer comprises a quartz crystal.

16. The method of claim 13 wherein said multiple modes frequency outputs comprise at least one of the following types of data:
flexural plate mode (FMP) data;
acoustic plate mode data;
shear-horizontal acoustic plate mode (SH-APM) data;
amplitude plate mode (APM) data;
thickness shear mode (TSM) data;
surface acoustic wave mode (SAW);
bulk acoustic wave mode (BAW) data;
torsional mode data, love wave data;
leaky surface acoustic wave mode (LSAW) data; or
pseudo surface acoustic wave mode (PSAW) data.

17. The method of claim 13 further comprising the step of configuring said interdigital transducer to comprise electrode materials selected from among a group of materials comprising at least one of the following metals: Al, Pt, Au, Rh, Ir, Cu, Ti, W, Cr, or Ni.

18. The method of claim 13 further comprising the step of configuring said interdigital transducer to comprise electrode materials selected from among a group of materials comprising alloys.

19. The method of claim 13 further comprising the step of configuring said interdigital transducer comprises electrode materials selected from among a group of materials comprising metal-nonmetal compounds.

20. The method of claim 13 further comprising the step of locating said surface wave device within a tire in order to generate multiple modes frequency outputs in which temperature and pressure effect changes are separated from one another for respective temperature and pressure analysis of said tire.

* * * * *